3,157,671
1,1-DIETHYL-3-HYDROXYPYRROLIDINIUM
BROMIDE BENZILATE ESTER
Ralph Edward Bowman, Northolt, Middlesex, John Frederick Cavalla, Isleworth, Middlesex, and John Davoll, Shepperton, Middlesex, England, assignors to Parke, Davis & Company, Detroit, Mich., a corporation of Michigan
No Drawing. Continuation of application Ser. No. 641,830, Feb. 25, 1957. This application Feb. 14, 1962, Ser. No. 173,128
Claims priority, application Great Britain Feb. 22, 1956
1 Claim. (Cl. 260—326.3)

This invention relates to a new chemical compound having useful therapeutic properties and to a process for the production thereof. In particular, the invention concerns the compound, 1,1-diethyl-3-hydroxypyrrolidinium bromide benzilate ester. This compound possesses a high degree of anticholinergic activity and hence can be used for the relief of peptic ulcer pain and spasm. Therapeutic compositions are produced by constituting the mentioned compound in dosage unit form with pharmaceutical carriers or diluents such as sugars, talc, corn starch and the like. The dosage unit is conveniently provided in the form of a tablet, capsule, powder or a similar form.

In accordance with the invention, 1,1-diethyl-3-hydroxypyrrolidinium bromide benzilate ester is prepared by reacting 1-ethyl-3-hydroxypyrrolidine benzilate ester with ethyl bromide. While a solvent for the reaction is unnecessary, the reaction is preferably carried out in an non-reactive organic solvent such as acetone, isopropanol, ethanol or methylethyl ketone. The reaction temperature may be varied widely and is not particularly critical. In general, a reaction temperature below about 100° C. is preferred, and for convenience, the reaction is carried out at room temperature or in the cold after which the reaction mixture is subjected to reflux for a brief period, e.g. about one hour, to facilitate completion of the reaction. The proportion of the reactants can be varied widely, but for reasons of economy at least an equimolar quantity, and preferably an excess, of ethyl bromide is employed.

The production of the product of the invention is illustrated as follows: 22 g. of 1-ethyl-3-hydroxypyrrolidine benzilate ester is mixed with 32 g. of ethyl bromide in 100 ml. of isopropanol and the mixture kept at 0° C. for twenty-four hours. The mixture is then heated under reflux for one hour and allowed to cool. On standing, 1,1-diethyl-3-hydroxypyrrolidinium bromide benzilate ester separates out and is collected and dried; M.P. 196–197° C.

The above benzilate ester starting material is prepared from 1-ethyl-3-hydroxypyrrolidine which in turn is prepared from 1,4-dichloro-3-butanol, as follows: 1,4-dichloro-3-butanol (429 g.) is mixed with anhydrous ethylamine (423 g.) at −30° C. and the mixture heated in an autoclave at 105–110° C. for five hours, then cooled and the product removed and dissolved in water (200 ml.). A solution of potassium hydroxide (395 g.) in water (395 ml.) is added to the solution, and the mixture is cooled, filtered and the solid washed separately with benzene. The aqueous filtrate is then treated with solid potassium hydroxide until an oily layer separates; this is removed and treated with more potash until no further water separates. The combined aqueous layers are then extracted with the benzene washings of the potassium chloride above, which are then added to the oil. This is then fractionated in vacuo to give 1-ethyl-3-hydroxypyrrolidine, B.P. 94–100° C. at 20 mm., or $n_D^{20}$ 1.4662.

A mixture consisting of 23 g. of 1-ethyl-3-hydroxy pyrrolidine, 51.2 g. of ethyl benzilate and 150 ml. of benzene is subjected to azeotropic distillation to remove traces of water; metallic sodium (250 mg.) is added to the residual solution. The mixture is heated under reflux for about eight hours while slowly drawing off the benzene-alcohol azeotrope formed. The reaction mixture is cooled, treated with 1 ml. of acetic acid and washed with water. The benzene is removed by distillation and the residue distilled in vacuo to obtain 1-ethyl-3-hydroxypyrrolidine benzilate ester as a viscous oil; B.P. 164–170° C. at 0.2 mm.

This application is a continuation of Serial No. 641,830, filed February 25, 1957, now abandoned.

We claim:
1,1-diethyl-3-hydroxypyrrolidinium bromide benzilate ester.

References Cited in the file of this patent
UNITED STATES PATENTS

| | | |
|---|---|---|
| 2,838,521 | Lunsford | June 10, 1958 |
| 2,890,985 | Marsh et al. | June 16, 1959 |
| 2,902,404 | Spencer | Sept. 1, 1959 |
| 2,918,406 | Biel | Dec. 22, 1959 |
| 2,980,693 | Cavalla | Apr. 18, 1961 |
| 2,987,517 | Martin et al. | June 6, 1961 |

FOREIGN PATENTS

| | | |
|---|---|---|
| 483,258 | Great Britain | Apr. 14, 1938 |